United States Patent [19]
Asano et al.

[11] Patent Number: 6,111,367
[45] Date of Patent: Aug. 29, 2000

[54] LIGHT EMISSION CIRCUIT

[75] Inventors: Isao Asano; Satoshi Nakajima, both of Tokyo, Japan

[73] Assignee: Hochiki Corporation, Tokyo, Japan

[21] Appl. No.: 09/231,073

[22] Filed: Jan. 14, 1999

[30] Foreign Application Priority Data

Jan. 22, 1998 [JP] Japan .................................. 10-010596

[51] Int. Cl.[7] ...................................................... G05F 1/00
[52] U.S. Cl. ............................................. 315/291; 372/38
[58] Field of Search ..................................... 315/291, 136, 315/297, 307; 362/800; 372/38; 356/71

[56] References Cited

U.S. PATENT DOCUMENTS

| | | | |
|---|---|---|---|
| 4,611,117 | 9/1986 | Seibert et al. | 250/252.1 |
| 4,618,257 | 10/1986 | Bayne et al. | 356/71 |
| 5,742,133 | 4/1998 | Wilhelm et al. | 315/291 |
| 5,822,346 | 10/1998 | Arai | 372/38 |
| 5,978,124 | 11/1999 | Maekawa et al. | 372/38 |

*Primary Examiner*—Don Wong
*Assistant Examiner*—Thuy Vinh Tran
*Attorney, Agent, or Firm*—Sughrue, Mion, Zinn, Macpeak & Seas, PLLC

[57] ABSTRACT

A D/A converter outputs analog voltage in a range of 0 to 2 V in accordance with a digital value in a range of 0 to 31 outputted from a light emission control unit, and supplies the analog voltage to a voltage/current conversion unit. Driving current outputted from the voltage/current conversion unit is controlled on a 1 mA unit basis in a range of 0 to 31 mA in accordance with the digital value. Driving current outputted from a voltage/current conversion unit is controlled on a 4 mA unit basis in a range of 0 to 124 mA, and driving current outputted from a voltage/current conversion unit is controlled on a 20 mA unit basis in a range of 0 to 620 mA. The voltage/current conversion units are on-off controlled in accordance with range designation signals, respectively. Accordingly, the luminance of the LED can be controlled in a wide range and accurately even in a low luminance level.

7 Claims, 2 Drawing Sheets

LIGHT EMISSION CIRCUIT

BACKGROUND OF THE INVENTION

1. Field of the Invention

The present invention relates to a light emission circuit capable of controlling luminance of a light emitting diode (hereinafter called an LED) or the like in a photoelectric smoke detector of the like.

2. Description of the Related Art

FIG. 2 is a diagram showing the arrangement of a conventional light emission circuit.

The light emission circuit emits light with desired luminance from an LED 1 in the photoelectric smoke detector. The light emission circuit has a light emission control unit 2 formed by a microprocessor or the like. The light emission control unit 2 is connected to a digital-to-analog converter (hereinafter called a D/A converter) 3 to which a digital value DV for controlling the luminance of the LED 1 is supplied from the light emission control unit. The D/A converter 3 converts the digital value DV supplied from the light emission control unit 2 into an analog voltage AV and outputs the analog voltage. The output side of the D/A converter 3 is connected to the positive (+) input terminal of an operational amplifier 4. The output side of the operational amplifier 4 is connected to the base of a transistor 5.

A capacitor 6 and a resistor 7 are connected in parallel to the base and the emitter of the transistor 5. The emitter of the transistor 5 is connected to the negative (−) input terminal of the operational amplifier 4. The emitter of the transistor 5 is connected to a ground voltage GND through a resistor 8 and the collector thereof is connected to the cathode of the LED 1. The anode of the LED 1 is supplied with power supply voltage VP.

In such a light emission circuit, when the light emission control unit 2 outputs the digital value DV corresponding to desired luminance, the D/A converter 3 converts the digital value DV into the analog voltage AV corresponding thereto and supplies the analog voltage to the operational amplifier 4. The analog voltage AV is converted into a predetermined driving current DI by a voltage/current conversion circuit formed by the operational amplifier 4, a transistor 5, a capacitor 6 and resistors 7, 8. The driving current DI thus converted flows into the LED 1 through the transistor 5, whereby the LED 1 emits light with the luminance corresponding to the digital value DV.

However, the conventional light emission circuit has the following problems.

When the driving current DI for the LED 1 is controlled discretely at every 1 mA or on a 1 mA unit basis within a range of 0 to 800 mA, for example, in order to obtain accurate luminance in a wide range, the D/A converter 3 is required to have high accuracy and resolution of 800 levels.

For example, if the analog voltage AV outputted from the high accuracy D/A converter 3 is in a range of 0 to 2 V, the voltage change width per one level is 2.5 mV . In this respect, since the operational amplifier 4 has an offset voltage of about 10 mV in general, an error of the driving current DI becomes large in particular at the low level thereof, so that it was difficult to drive the LED 1 accurately.

SUMMARY OF THE INVENTION

It is an object of the present invention is to provide a light emission circuit capable of obtaining desired luminance in a wide range and control the luminance accurately even in low level luminance.

According to a first aspect of the present invention, a light emission circuit comprises: light emission means for emitting light with luminance according to driving current supplied thereto; light emission control means for outputting a range designation signal for designating a control range of the luminance and a level designation signal for designating a level of the luminance as a digital value in order to control luminance of the light emission means; digital-to-analog conversion means for converting the level designation signal into analog voltage; first driving means, with which the analog voltage is supplied, for generating driving current in a first range proportional to the analog voltage and supplying the driving current to the light emission means; and second driving means, with which the range designation signal and the analog voltage are supplied, for generating driving current in a second range which is wider than the first range and proportional to the analog voltage when designated by the range designation signal, and supplying the driving current in a second range to the light emission means.

According to a second aspect of the present invention, in a light emission circuit according to the first aspect, the second driving means comprises: an amplifier for amplifying the analog voltage; an analog switch for selectively outputting output voltage of the amplifier in accordance with the range designation signal; and a transistor for controlling a value of the driving current in a second range in accordance with the output voltage of the amplifier supplied through the analog switch.

According to a third aspect of the present invention, a light emission circuit comprises: light emission means for emitting light with luminance according to driving current supplied thereto; light emission control means for outputting a level designation signal for designating a level of the luminance as a digital value of lower m bits and upper n bits (where n and m are integers of 1 or more) in order to control luminance of the light emission means; first digital-to-analog conversion means for converting the lower m bits of the level designation signal into first analog voltage; second digital-to-analog conversion means for converting the upper n bits of the level designation signal into second analog voltage; first driving means, with which the first analog voltage is supplied, for generating driving current in a first range proportional to the first analog voltage and supplying the driving current to the light emission means; and second driving means, with which the second analog voltage is supplied, for generating driving current in a second range which is more wide than the first range and proportional to the second analog voltage, and supplying the driving current in a second range to the light emission means.

According to the first and second aspect of the present invention, the following operation is performed since the light emission circuit is arranged in the aforesaid manner.

When the light emission control means outputs the level designation signal, the D/A conversion means generates the analog voltage on the basis of the level designation signal. The first driving means generates the driving current in the first range proportional to the analog voltage and supplies the driving current to the light emission means.

When the light emission control means outputs the range designation signal as well as the level designation signal, the second driving means generates the driving current in the second range proportional to the analog voltage and supplies the driving current in the second range in addition to the driving current in the first range generated by the first driving means to the light emission means.

According to the third aspect, the following operation is performed.

The lower m bits of the level designation signal outputted from the light emission control means is converted into the first analog voltage by the first D/A conversion means and supplied to the first driving means. The first driving means generates the driving current in the first range proportional to the first analog voltage and supplies the driving current to the light emission means.

The upper n bits of the level designation signal outputted from the light emission control means is converted into the second analog voltage by the second D/A conversion means and supplied to the second driving means. The second driving means generates the driving current in the second range proportional to the second analog voltage and supplies the driving current in the second range in addition to the driving current in the first range generated by the first driving means to the light emission means.

PREFERRED EMBODIMENTS OF THE INVENTION

Preferred embodiments according to the present invention will be described referring to the accompanying drawings as follows.

First Embodiment

Figure 1:
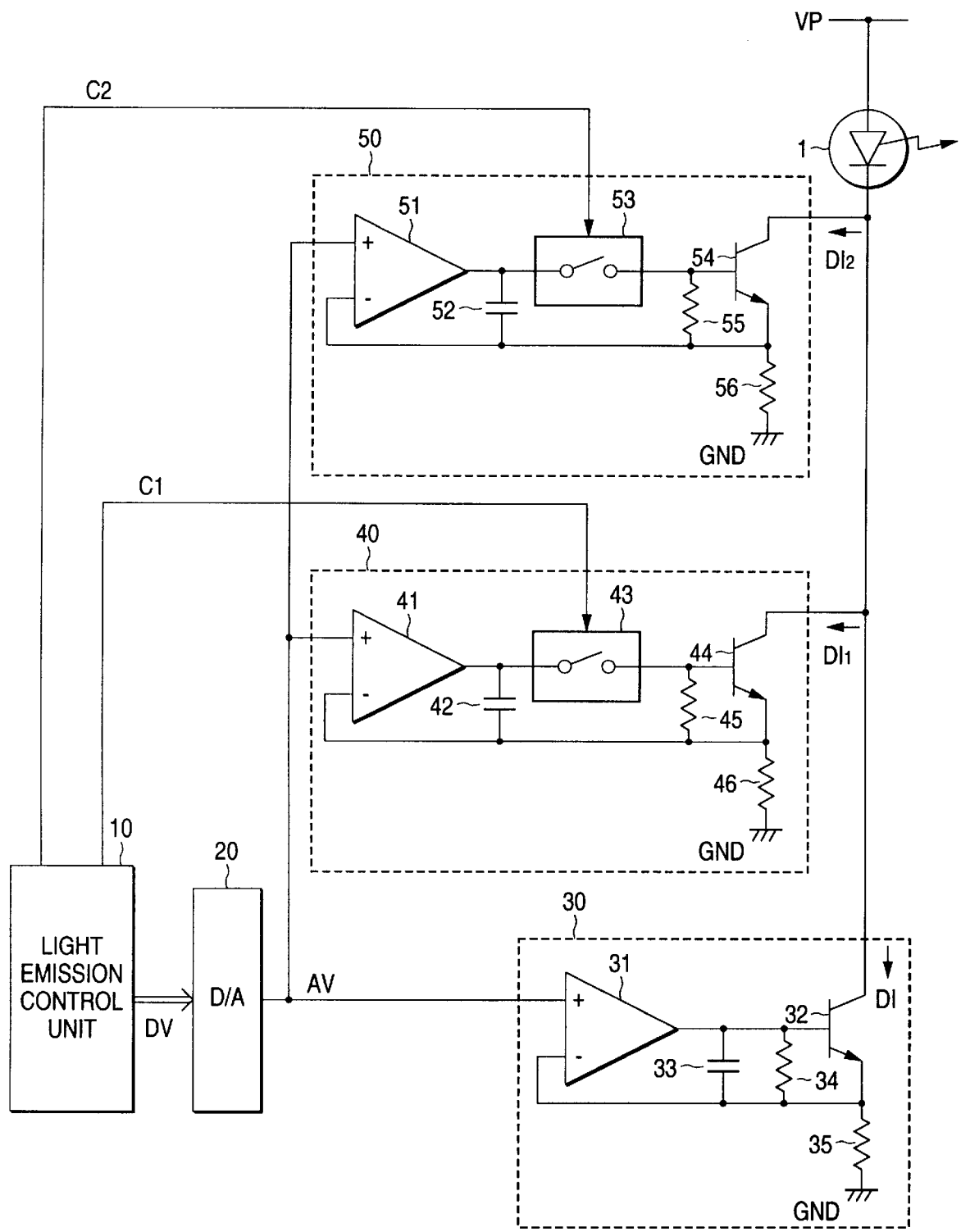
FIG. 1 is a diagram showing the arrangement of the light emission circuit according to a first embodiment.
Figure 2:
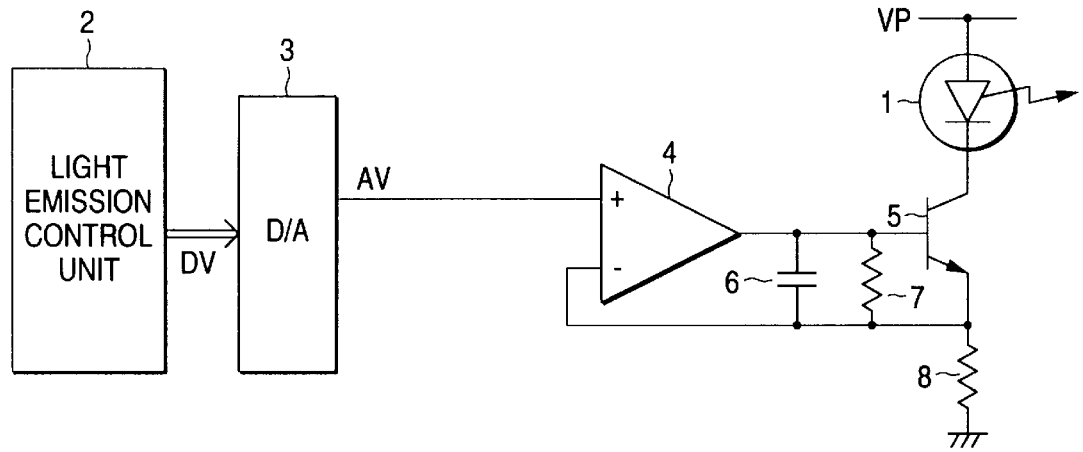
FIG. 2 is a diagram showing the arrangement of a conventional light emission circuit.

FIG. 1 is a diagram showing the arrangement of the light emission circuit according to a first embodiment of the present invention.

The light emission circuit is a circuit capable of driving a LED 1 with desired luminance in a photoelectric smoke detector or the like, for example. The light emission circuit has a light emission control unit 10 formed by a microprocessor or the like. The light emission control unit 10 has a function of outputting range designation signals C1, C2 for designating the luminance control ranges of the LED 1 and further outputting a level designation signal for designating the luminance level by a digital value DV of 5 bits (that is, a value in a range of 0 to 31), for example. The digital value DV of the level designation signal is supplied to a D/A converter 20.

The D/A converter 20 outputs analog voltage AV in a range of 0 to 2 V in accordance with the digital value DV. The output side of the D/A converter 20 is connected to the input side of a voltage/current conversion unit 30.

The voltage/current conversion unit 30 is formed by an operational amplifier 31, a transistor 32, a capacitor 33 and resistors 34, 35. The analog-voltage AV is applied to the positive (+) input terminal of the operational amplifier 31. The output side of the operational amplifier 31 is connected to the base of the transistor 32. The capacitor 33 and the resistor 34 are connected in parallel between the base and the emitter of the transistor 32 The emitter of the transistor 32 is connected to the negative (−) input terminal of the operational amplifier 31. The emitter of the transistor 32 is connected to a ground voltage GND through the resistor 35 and the collector thereof is connected to the cathode of the LED 1. The anode of the LED 1 is supplied with power supply voltage VP. Thus, the LED 1 is driven by driving current DI flowing through the transistor 32.

The resistance value of the resistor 35 is set at 65Ω, for example. When the analog voltage AV is in a range of 0 to 2 V, the driving current DI can be controlled on a 1 mA unit basis within a range of about 0 to 31 mA in accordance with the digital value DV.

The light emission circuit is provided with voltage/current conversion units 40, 50 having the same arrangement. The voltage/current conversion unit 40 is formed by an operational amplifier 41, a capacitor 42, an analog switch 43, a transistor 44, and resistors 45, 46. The analog voltage AV is applied to the positive (+) input terminal of the operational amplifier 41.

The output side of the operational amplifier 41 is connected to the one end of the-capacitor 42 and the one end of the analog switch 43. The analog switch 43 is turned on and off in accordance with the range designation signal C1 supplied from the light emission control unit 10. The other end of the analog switch 43 is connected to the base of the transistor 44. The resistor 45 is connected between the base and the emitter of the transistor 44. The emitter of the transistor 44 is connected to the other end of the capacitor 42 and the negative (−) input terminal of the operational amplifier 41. The emitter of the transistor 44 is further connected to the ground voltage GND through the resistor 46 and the collector thereof is connected to the cathode of the LED 1. Thus, the LED 1 is supplied with driving current DI1 flowing through the transistor 44.

The resistance value of the resistor 46 is set at 16Ω, for example. When the analog switch 43 is controlled to be in an on state by the range designation signal C1, the driving current DI1 can be controlled on a 4 mA unit basis within a range of about 0 to 124 mA in accordance with the digital value DV.

Similarly, the analog switch 53 of the voltage/current conversion unit 50 is turned on and off in accordance with the range designation signal C2 supplied from the light emission control unit 10. When the analog switch 53 is turned on, a driving current DI2 flowing through a transistor 54 is supplied to the LED 1. The resistance value of a resistor 56 is set at 3.2 ?, for example. The driving current DI2 is controlled on a 20 mA unit basis within a range of about 0 to 620 mA in accordance with the digital value DV.

The operation of this light emission circuit will be described as follows.

In the case of setting the driving current of the LED 1 at a predetermined value (for example 10 mA) within the range of 0 to 31 mA, the analog switches 43, 53 are turned off in accordance with the range designation signals C1, C2 delivered from the light emission control unit 10, respectively. As a consequence, both the transistors 44, 54 are turned off and so each of the driving currents DI1, DI2 becomes 0. In this state, if the digital value DV outputted from the light emission control unit 10 is set at 10, the driving current DI outputted from the voltage/current conversion unit 30 becomes 10 mA in accordance with the digital value DV. Thus, the LED 1 is driven by the driving current of 10 mA and desired luminance can be obtained.

In the case of setting the driving current of the LED 1 at a predetermined value (for example 200 mA) not less than 32 mA, both the analog switches 43, 53 are turned on in accordance with the range designation signals C1, C2 delivered from the light emission control unit 10, respectively. Further, the digital value DV outputted from the light emission control unit 10 is set at 8. As a consequence, the driving current DI of 80 mA is outputted from the voltage/current conversion unit 30, and the driving current DI1 of 32 mA and the driving current DI2 of 160 mA are outputted from the voltage/current conversion units 40 and 50, respectively. Thus, the LED 1 is driven by the driving current of 200 mA in total and desired luminance can be obtained.

As described above, the light emission circuit according to the first embodiment includes the voltage/current conversion unit 30 which controls the driving current DI on a 1 mA unit basis in accordance with the digital value DV, the voltage/current conversion unit 40 which can selectively stop the supply of the driving current DI1 on a 4 mA unit basis in accordance with the range designation signal C1, and the voltage/current conversion unit 50 which can selectively stop the supply of the driving current DI2 on a 20 mA unit basis in accordance with the range designation signal C2. According to such an arrangement, the first embodiment is advantageous in that the luminance can be controlled in a wide range.

Further, the analog voltage AV outputted from the D/A converter 20 changes in a range of 0 to 2 V at 32 levels, so that the voltage change width of the D/A converter per one level is 62.5 mV. This voltage change width is sufficiently larger than the general offset voltage (for example, 10 mV) of the operational amplifiers 31, 41, 51. Accordingly, the first embodiment is advantageous in that the error due to the offset voltage can be made small and the LED 1 can be driven accurately.

Furthermore, the analog switch 43 is provided between the operational amplifier 41 and the transistor 44 in the voltage/current conversion unit 40, and the analog switch 53 is provided between the operational amplifier 51 and the transistor 54 in the voltage/current conversion unit 50. Accordingly, when the analog switches 43, 53 are in off states, the first embodiment can eliminate such a problem that the driving currents DI1, DI2 contain errors due to the offset voltages of the operational amplifiers 41, 51, respectively. Further, the first embodiment is advantageous in that the LED 1 can be driven with higher accuracy.

Second Embodiment

Figure 3:
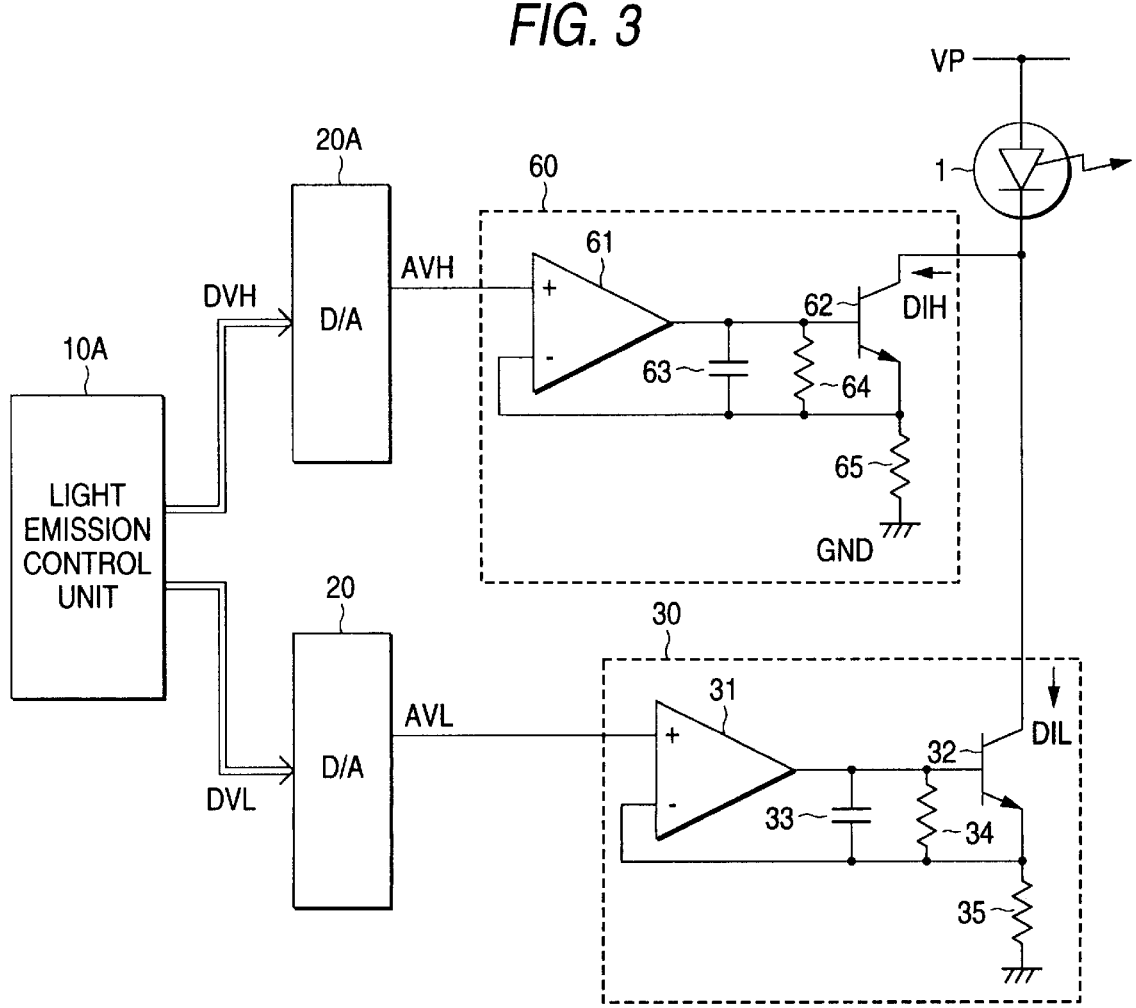
FIG. 3 is a diagram showing the arrangement of the light emission circuit according to a second embodiment.

FIG. 3 is a diagram showing the arrangement of the light emission circuit according to the second embodiment of the present invention, in which elements common to those of FIG. 1 are marked with the same numerals.

The light emission circuit of this embodiment includes a light emission control unit 10A formed by a microprocessor or the like. The light emission control unit 10A has a function of outputting a level designation signal for designating the luminance level of the LED 1 by a digital value DV of 10 bits, for example. A digital value DVL representing the lower m (for example, m=5) bits of the digital value DV of the level designation signal is supplied to a D/A converter 20.

The D/A converter 20 outputs an analog voltage AVL in a range of 0 to 2 V in accordance with the digital value DVL of 5 bits (that is, a value in a range of 0 to 31). The output side of the D/A converter 20 is connected to the input side of the voltage/current conversion unit 30.

A digital value DVH representing the upper n (for example, n=5) bits of the digital value DV is supplied to a D/A converter 20A. Like the D/A converter 20, the D/A converter 20A outputs an analog voltage AVH in a range of 0 to 2 V in accordance with the digital value DVH of 5 bits (that is, a value in a range of 0 to 31). The output side of the D/A converter 20A is connected to the input side of a voltage/current conversion unit 60.

Like the voltage/current conversion unit 30, the voltage/current conversion unit 60 is formed by an operational amplifier 61, a transistor 62, a capacitor 63 and resistors 64, 65. The analog voltage AVH is applied to the positive (+) input terminal of the operational amplifier 61. The resistance value of the resistor 65 is set to such a value that the value of a current DIH can be controlled on a 32 mA unit basis in accordance with the digital value DVH when the value of the current DIH supplied to the LED 1 from the driving transistor 62 is in a range of 0 to 992 mA.

The operation of this light emission circuit will be described as follows.

In the case of setting the driving current of the LED 1 at a predetermined value (for example 200 mA) within the range of 0 to 1023 mA, the digital value DV outputted from the light emission control unit 10A is set at 200 (that is, 11001000 in a binary notation). Thus, the lower 5 bits of the digital value DV (that is, 01000 in a binary notation) is supplied to the D/A converter 20 as the digital value DVL. Further, the upper 5 bits of the digital value DV (that is, 00110 in a binary notation) is supplied to the D/A converter 20A as the digital value DVH.

The D/A converter 20 generates the analog voltage AVL corresponding to the digital value DVL (=8) and supplies the analog voltage to the voltage/current conversion unit 30. As a consequence, a driving current DIL outputted from the voltage/current conversion unit 30 becomes 8 mA in accordance with the digital value DVL.

The D/A converter 20A generates the analog voltage AVH corresponding to the digital value DVH (=6) and supplies the analog voltage to the voltage/current conversion unit 60. As a consequence, a driving current DIH outputted from the voltage/current conversion unit 60 becomes 192 mA in accordance with the digital value DVH.

Thus, the LED 1 is driven by the driving current DIL, DIH of 200 mA in total and a desired luminance can be obtained.

As described above, the light emission circuit according to the second embodiment includes the voltage/current conversion unit 30 which controls the driving current DIL on a 1 mA unit basis in accordance with the lower 5 bits of the digital value DV, and the voltage/current conversion unit 60 which controls the driving current DIH on a 32 mA unit basis in accordance with the upper 5 bits of the digital value DV According to such an arrangement, the second embodiment is advantageous in that the luminance can be controlled in a wide range and on a fine unit basis.

Further, each of the analog voltages AVL, AVH respectively outputted from the D/A converters 20, 20A changes in a range of 0 to 2 V at 32 levels, so that the voltage change width of the D/A converters per one level is 62.5 mV. This voltage change width is sufficiently larger than the general offset voltage (for example, 10 mV) of the operational amplifiers 31, 61. Accordingly, the second embodiment is advantageous in that the error due to the offset voltage can be made small and the LED 1 can be driven accurately.

The present invention is not limited to the aforesaid embodiments and various kinds of modification can be made. For example, the present invention may be modified in the following manners (a) to (h) as examples of the modification.

(a) Although the explanation has been made as to the case where the light emission circuit is applied to a photoelectric smoke detector, the present invention is not limited thereto and may be applied to application which needs the control of the luminance.

(b) Although an LED is employed as the light emission means, a light emission element such as a laser diode may be employed therefor.

(c) Although the D/A converter 20 of FIG. 1 converts the digital value DV of 5 bits into the analog voltage AV in a range of 0 to 2 V, the present invention is not limited to such values, and suitable values may be used in accordance with the required resolution and the control range.

(d) The voltage/current conversion units 30, 40, 50, 60 are not limited to the circuit arrangements shown in FIGS. 1 and 3, but the voltage/current conversion units may employ any kinds of circuit arrangements so long as they can convert the analog voltage AV into the driving currents DI, DI1, DI2, DIH corresponding thereto and output the driving currents.

(e) Although the driving circuit is arranged by inserting the voltage/current conversion units 30, 40, 50, 60 between the LED 1 and the ground voltage, the driving circuit may be arranged by inserting the voltage/current conversion units 30, 40, 50, 60 between the LED 1 and the power supply voltage VP.

(f) Although the light emission circuit of FIG. 1 includes the two voltage/current conversion units 40, 50 being controlled in accordance with the range designation signals C1, C2, respectively, the light emission circuit may be arranged to include only one voltage/current conversion unit or three or more voltage/current conversion units. The more the number of the voltage/current conversion units contained in the light emission circuit, the driving current LD can be set more finely.

(g) Although the light emission control unit 10A of FIG. 3 divides the digital value DV into upper and lower 5 bits and supplies these two 5 bits to the D/A converters 20, 20A, the divided bit numbers are not limited thereto, and the digital value may be divided into arbitrary bit numbers m, n.

(h) Although the light emission circuit of FIG. 3 is arranged to drive the LED 1 by providing the two sets of the D/A converters 20, 20A and the two sets of the voltage/current conversion units 30, 60, the light emission circuit may be arranged to drive the LED 1 by providing three or more sets of the D/A converters and the three or more sets of the voltage/current conversion units. According to such a configuration, the luminance can be controlled in a more wide range and with more high accuracy.

As described above in detail, the light emission circuit is arranged to include the digital-to-analog conversion means for converting the level designation signal into the analog voltage, the first driving means for generating the driving current in a first range proportional to the analog voltage, and the second driving means for generating the driving current in a second range which is more wide than the first range and proportional to the analog voltage. Accordingly, the present invention is advantageous in that the luminance of the light emission means can be controlled accurately in accordance with the driving current of a low level by mean of the first driving means, and the luminance of the light emission means can be controlled in accordance with the driving current of a wide range by mean of the second driving means.

The second driving means includes the operational amplifier, the transistor for supplying the driving current and the analog switch for selectively turning on and off the path between the operational amplifier and the transistor. Accordingly, the present invention is advantageous in that, when the analog switch is in an off state, there is no influence due to the offset voltage of the operational amplifier and further the luminance of the light emission means can be controlled by the driving current with higher accuracy.

The light emission circuit is arranged to include the first D/A conversion means for converting the lower bits of the digital value of the level designation signal into the first analog voltage, the first driving means for supplying the driving current in a first range in accordance with the first analog voltage, the second D/A conversion means for converting the upper bits of the digital value of the level designation signal into the second analog voltage, and the second driving means for supplying the driving current in a second range in accordance with the second analog voltage. Accordingly, the present invention is advantageous in that the luminance of the light emission means can be controlled accurately and finely in a wide range.

What is claimed is:

1. A light emission circuit comprising:

light emission means for emitting light with luminance according to driving current supplied thereto;

light emission control means for outputting a range designation signal for designating a control range of the luminance and a level designation signal for designating a level of the luminance as a digital value in order to control luminance of said light emission means;

digital-to-analog conversion means for converting said level designation signal into analog voltage;

first driving means, with which said analog voltage is supplied, for generating driving current in a first range proportional to said analog voltage and supplying the driving current to said light emission means; and second driving means, with which said range designation signal and said analog voltage are supplied, for generating driving current in a second range which is wider than said first range and proportional to said analog voltage when designated by said range designation signal, and supplying the driving current in a second range to said light emission means.

2. A light emission circuit according to claim 1, wherein said second driving means comprises:

an amplifier for amplifying said analog voltage;

an analog switch for selectively outputting output voltage of said amplifier in accordance with said range designation signal; and a transistor for controlling a value of said driving current in a second range in accordance with the output voltage of said amplifier supplied through said analog switch.

3. A light emission circuit according to claim 1, wherein said light emission means is a laser diode.

4. A light emission circuit according to claim 1, wherein said light emission means is a light emitting diode.

5. A light emission circuit comprising:

light emission means for emitting light with luminance according to driving current supplied thereto;

light emission control means for outputting a level designation signal for designating a level of the luminance as a digital value of lower m bits and upper n bits (where n and m are integers of 1 or more) in order to control luminance of said light emission means;

first digital-to-analog conversion means for converting said lower m bits of said level designation signal into first analog voltage;

second digital-to-analog conversion means for converting said upper n bits of said level designation signal into second analog voltage;

first driving means, with which said first analog voltage is supplied, for generating driving current in a first range proportional to said first analog voltage and supplying the driving current to said light emission means; and second driving means, with which said second analog voltage is supplied, for generating driving current in a second range which is more wide than said first range and proportional to said second analog voltage, and supplying the driving current in a second range to said light emission means.

6. A light emission circuit according to claim 3, wherein said light emission means is a laser diode.

7. A light emission circuit according to claim 3, wherein said light emission means is a light emitting diode.

* * * * *